United States Patent
Watanabe et al.

(10) Patent No.: US 9,362,557 B2
(45) Date of Patent: Jun. 7, 2016

(54) NEGATIVE ELECTRODE ACTIVE MATERIAL FOR ELECTRIC DEVICE, NEGATIVE ELECTRODE FOR ELECTRIC DEVICE AND ELECTRIC DEVICE

(75) Inventors: Manabu Watanabe, Yokosuka (JP); Osamu Tanaka, Yokosuka (JP); Masao Yoshida, Zushi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 24 days.

(21) Appl. No.: 14/003,167

(22) PCT Filed: Mar. 6, 2012

(86) PCT No.: PCT/JP2012/055667
§ 371 (c)(1),
(2), (4) Date: Sep. 4, 2013

(87) PCT Pub. No.: WO2012/121241
PCT Pub. Date: Sep. 13, 2012

(65) Prior Publication Data
US 2014/0001401 A1  Jan. 2, 2014

(30) Foreign Application Priority Data

Mar. 7, 2011 (JP) .................................. 2011-048813
May 25, 2011 (JP) .................................. 2011-116891

(51) Int. Cl.
*H01M 4/38* (2006.01)
*H01G 4/008* (2006.01)
*H01M 4/46* (2006.01)
*C22C 28/00* (2006.01)
*C22C 30/00* (2006.01)
*C22C 21/02* (2006.01)
*H01M 10/052* (2010.01)

(52) U.S. Cl.
CPC ............... *H01M 4/386* (2013.01); *C22C 28/00* (2013.01); *C22C 30/00* (2013.01); *H01G 4/008* (2013.01); *H01M 4/463* (2013.01); *B22F 2998/00* (2013.01); *C22C 21/02* (2013.01); *H01M 10/052* (2013.01); *Y02T 10/7011* (2013.01)

(58) Field of Classification Search
None
See application file for complete search history.

(56) References Cited

U.S. PATENT DOCUMENTS

| 7,732,095 | B2 | 6/2010 | Christensen et al. |
| 7,972,727 | B2 | 7/2011 | Christensen et al. |
| 2007/0128517 | A1 | 6/2007 | Christensen et al. |
| 2010/0167126 | A1 | 7/2010 | Christensen et al. |

FOREIGN PATENT DOCUMENTS

| EP | 2 595 223 A2 | 5/2013 |
| JP | 2009-032644 A | 2/2009 |
| JP | 2009-517850 A | 4/2009 |
| JP | 4406789 B2 | 11/2009 |

OTHER PUBLICATIONS

Supplementary European Search Report, dated Jul. 9, 2014, 5 pgs.
Japanese Office Action, Jan. 7, 2015, 5 pages.

*Primary Examiner* — Tanisha Diggs
(74) *Attorney, Agent, or Firm* — Foley & Lardner LLP

(57) ABSTRACT

A negative electrode active material for an electric device includes an alloy containing silicon in a range from 27% by mass to 100% by mass exclusive, aluminum in a range from 0% by mass to 73% by mass exclusive, niobium in a range from 0% by mass to 58% by mass exclusive, and inevitable impurities as a residue. The negative electrode active material can be obtained with a multi DC magnetron sputtering apparatus by use of, for example, silicon, aluminum and niobium as targets. An electric device using the negative electrode active material can achieve a high cycle property while keeping a high discharge property.

8 Claims, 4 Drawing Sheets

NEGATIVE ELECTRODE ACTIVE MATERIAL FOR ELECTRIC DEVICE, NEGATIVE ELECTRODE FOR ELECTRIC DEVICE AND ELECTRIC DEVICE

TECHNICAL FIELD

The present invention relates to a negative electrode active material for an electric device, a negative electrode for an electric device and an electric device. In particular, an electric device according to the present invention is used as a driving power source and an auxiliary power source of a motor serving as, for example, a secondary battery and a capacitor, for use in a vehicle such as an electric vehicle, a fuel cell vehicle and a hybrid electric vehicle.

BACKGROUND ART

There has been a strong demand for reduction of emissions of carbon dioxide in order to deal with atmospheric pollution and global warming. In the automobile industry, the reduction of emissions of carbon dioxide is highly expected in association with the spread of electric vehicles (EV) and hybrid electric vehicles (HEV). Thus, development of electric devices such as secondary batteries for driving motors as a key to practical application of such vehicles, is actively being carried out.

As for the secondary batteries for driving motors, lithium ion secondary batteries having high theoretical energy are gaining increasing attention, which is leading to rapid development of the lithium ion secondary batteries. The lithium ion secondary batteries generally include: positive electrodes obtained in a manner such that positive electrode slurry containing a positive electrode active material is applied to surfaces of current collectors, negative electrodes obtained in a manner such that negative electrode slurry containing a negative electrode active material is applied to surfaces of current collectors, and electrolyte layers interposed between these electrodes. The lithium ion secondary batteries have a constitution in which the positive electrodes, the negative electrodes and the electrolyte layers are housed in battery cases.

The lithium ion secondary batteries highly depend on the respective active materials used therein for improvement of capacity characteristics and output characteristics.

There is known a negative electrode material for a lithium ion secondary battery that achieves a high cycle property while keeping a high discharging capacity, as proposed in Patent Literature 1. The negative electrode material for a lithium ion secondary battery described in Patent Literature 1 includes several kinds of metallic components and carbon components containing fine carbon materials, and includes composite powder having a predetermined particle diameter.

CITATION LIST

Patent Literature

Patent Literature 1: Japanese Patent No. 4406789

SUMMARY OF INVENTION

However, investigation by the inventors revealed that the negative electrode material for a lithium ion secondary battery described in Patent Literature 1 did not have a sufficient discharging capacity and cycle property.

The present invention has been accomplished in view of the conventional problem. An object of the present invention is to provide a negative electrode active material for an electric device capable of achieving a high cycle property while keeping a high discharging capacity, and a negative electrode for an electric device and an electric device using the negative electrode active material.

A negative electrode active material for an electric device according to the aspect of the present invention includes an alloy containing silicon in a range from 27% by mass to 100% by mass exclusive, aluminum in a range from 0% by mass to 73% by mass exclusive, niobium in a range from 0% by mass to 58% by mass exclusive, and inevitable impurities as a residue.

DESCRIPTION OF EMBODIMENTS

Figure 1:
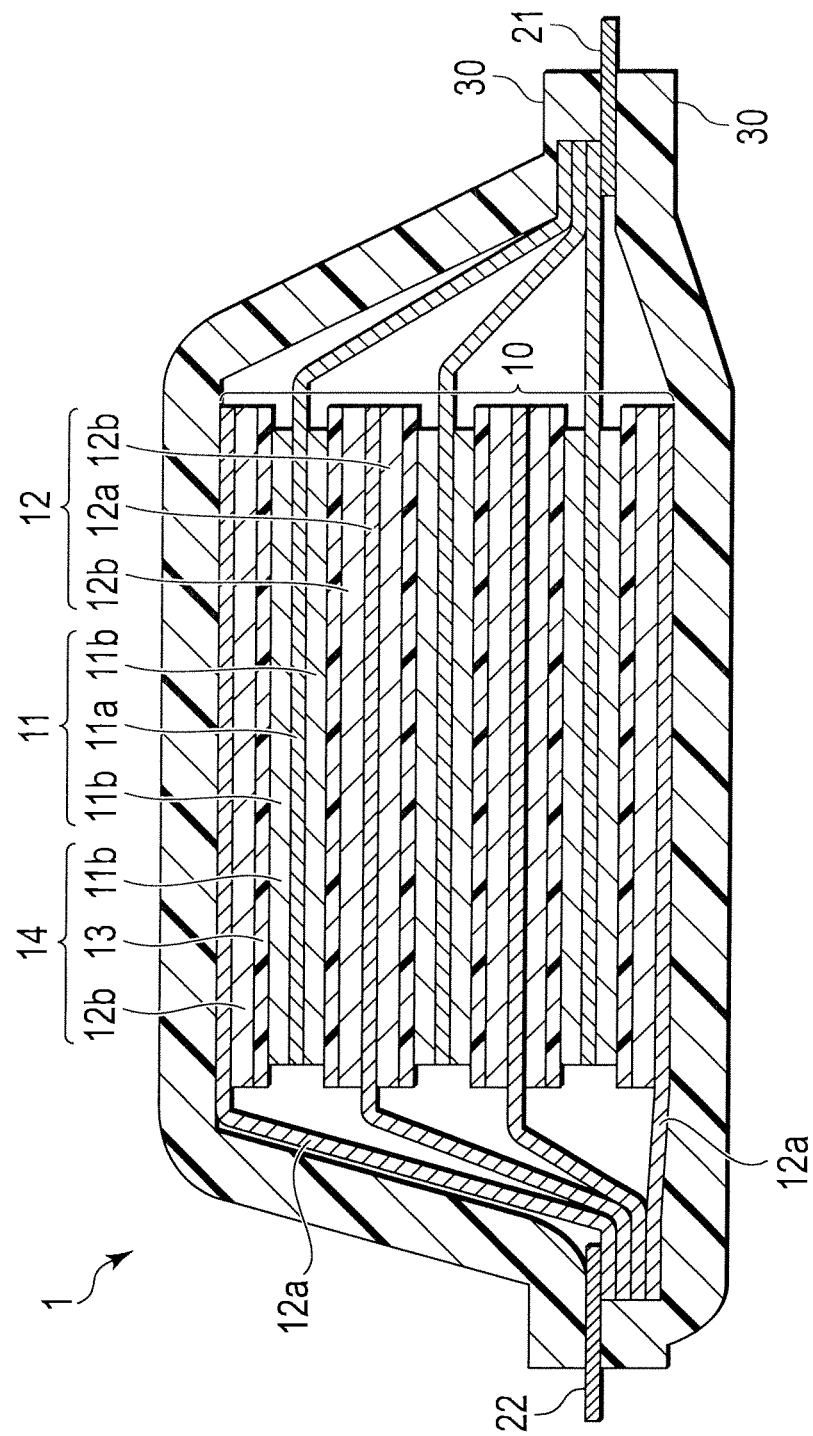
FIG. 1 is a schematic cross-sectional view showing an example of a lithium ion secondary battery according to an embodiment of the present invention.

Hereinafter, a negative electrode active material for an electric device, and a negative electrode for an electric device and an electric device using the negative electrode active material according to the present invention will be explained in detail. For reasons of convenience, the negative electrode active material for an electric device, the negative electrode for an electric device and the electric device are explained while referring to a lithium ion secondary battery as an example of the electric device using the negative electrode active material. It should be noted that dimensional ratios in the drawings are magnified for convenience of explanation and can be different from actual ratios.

[Negative Electrode Active Material for Lithium Ion Secondary Battery]

The negative electrode active material for a lithium ion secondary battery according to an embodiment of the present invention is explained in detail below.

A negative electrode active material according to the present embodiment includes an alloy containing silicon (Si) with content in the range from 27% by mass to 100% by mass exclusive, aluminum (Al) with content in the range from 0% by mass to 73% by mass exclusive, niobium (Nb) with content in the range from 0% by mass to 58% by mass exclusive, and inevitable impurities as a residue. These numerical ranges correspond to the area indicated by reference numeral A in FIG. 2.

This negative electrode active material can achieve a high cycle property while keeping a high discharging capacity compared to a carbon-based negative electrode active material having a charge-discharging capacity of approximately 300 mAh/g, and is therefore suitable for use in a negative electrode for a lithium ion secondary battery. Accordingly, the negative electrode active material is desirable for use in a lithium ion secondary battery as a driving power source and auxiliary power source used in a vehicle. The negative electrode active material is also applicable to lithium ion secondary batteries for mobile devices such as mobile phones.

In particular, when the negative electrode active material is used in the negative electrode of the lithium ion secondary battery, the alloy absorbs lithium ions when the battery is charged, and releases the lithium ions when the battery is discharged. The negative electrode active material contains aluminum (Al) as a first additive element that suppresses amorphous-crystal phase transition so as to extend cycle life when the negative electrode active material is alloyed with lithium by charging. The negative electrode active material further contains niobium (Nb) as a second additive element that acts so that the capacity of the electrode hardly decreases even if the concentration of the first additive element increases. Accordingly, the negative electrode active material of the Si (Si—Al—Nb series) alloy according to the present embodiment can ensure a high capacity and cycle durability, and further achieve high charge-discharge efficiency in the initial stage.

If the content of silicon in the negative electrode active material containing the Si—Al—Nb series alloy, is less than or equal to 27% by mass, a sufficient initial capacity may not be obtained. If the content of silicon is 100% by mass, a higher cycle property than that of conventional pure silicon is not expected. In addition, if the content of aluminum is 0% by mass, the cycle property obtained is substantially the same as that of pure silicon. If the content of aluminum is greater than or equal to 73% by mass, the initial capacity tends to decrease compared to existing negative electrode active materials because the content of silicon relatively decreases. Further, if the content of niobium is 0% by mass, the cycle property is substantially the same as that of pure silicon. If the content of niobium is greater than or equal to 58% by mass, the initial capacity tends to decrease compared to existing negative electrode active materials because the content of silicon decreases.

In order to achieve a higher cycle property, the alloy preferably contains silicon (Si) with content in the range from 47% by mass to 95% by mass exclusive, aluminum (Al) with content in the range from 2% by mass to 48% by mass exclusive, niobium (Nb) with content in the range from 1% by mass to 23% by mass exclusive, and inevitable impurities as a residue. These numerical ranges correspond to the area indicated by reference numeral B in FIG. 3.

In order to achieve a much higher cycle property, the alloy preferably contains silicon (Si) with content in the range from 61% by mass to 84% by mass exclusive, aluminum (Al) the content in the range from 2% by mass to 25% by mass exclusive, niobium (Nb) with content in the range from 2% by mass to 23% by mass exclusive, and inevitable impurities as a residue. These numerical ranges correspond to the area indicated by reference numeral C in FIG. 4.

Further, the alloy may contain silicon (Si) with content in the range from 47% by mass to 56% by mass exclusive, aluminum (Al) with content in the range from 33% by mass to 48% by mass exclusive, niobium (Nb) with content in the range from 1% by mass to 16% by mass exclusive, and inevitable impurities as a residue, which can also achieve a higher cycle property. These numerical ranges correspond to the area indicated by reference numeral D in FIG. 4.

Although the content of the inevitable impurities as a residue depends on the raw materials and the production method, the content thereof is, for example, preferably less than 0.5% by mass, more preferably less than 0.1% by mass.

As described above, the alloy contained in the negative electrode active material according to the present embodiment contains silicon (Si) with content in the range from 27% by mass to 100% by mass exclusive, aluminum (Al) with content in the range from 0% by mass to 73% by mass exclusive, niobium (Nb) with content in the range from 0% by mass to 58% by mass exclusive, and inevitable impurities as a residue. Namely, the alloy consists of silicon (Si) with content in the range from 27% by mass to 100% by mass exclusive, aluminum (Al) with content in the range from 0% by mass to 73% by mass exclusive, niobium (Nb) with content in the range from 0% by mass to 58% by mass exclusive, and inevitable impurities as a residue.

The following is an explanation of a method for manufacturing the negative electrode active material for a lithium ion secondary battery according to the present embodiment.

The negative electrode active material for a lithium ion secondary battery according to the present embodiment may be, as an example, a thin film alloy. Examples of the method for manufacturing such an alloy include a multi physical vapor deposition method (a multi PVD method) such as a sputtering method, a resistance heating method and a laser ablation method, and a multi chemical vapor deposition method (a multi CVD method) such as a chemical vapor-phase growth method. These manufacturing methods can provide the negative electrode in a manner such that the alloyed thin film is directly applied to the substrate serving as a current collector. Thus, these manufacturing methods contribute to simplification of the process. In addition, these manufacturing methods need not use other components, such as a binder and an electric conducting additive, other than the negative electrode active material (alloy). Accordingly, these manufacturing methods contribute to a higher capacity and energy density, which satisfy the level suitable for practical use in vehicles.

The method for manufacturing the thin film alloy may use an independently controllable ternary DC magnetron sputtering apparatus as a multi DC magnetron sputtering apparatus. This apparatus can freely form a silicon alloyed thin film containing predetermined amounts of Si, Al and Nb to have various alloy compositions and thicknesses, on the surface of the substrate serving as a current collector. For example, various types of alloys may be obtained in a manner as to define silicon (Si) as target 1, define aluminum (Al) as target 2, define niobium (Nb) as target 3, fix the sputtering time, and vary the power level of the DC power supply. For example, the power level of the DC power source is changed to 185 W for silicon (Si), changed in the range from 30 to 120 W for aluminum (Al), and changed in the range from 60 to 120 W for niobium (Nb), so as to obtain various types of alloys. Note that, since sputtering conditions depend on sputtering devices, it is preferable to estimate appropriate ranges of the sputtering conditions through preliminary tests for each sputtering device.

As described above, the negative electrode active material layer according to the present embodiment may be the Si—Al—Nb series alloyed thin film. Alternatively, the negative electrode active material layer may be a layer containing particles of the Si—Al—Nb series alloy. That is, the negative electrode active material for a lithium ion secondary battery according to the present embodiment may be, as another example, an alloy in a particle state.

Examples of the method for manufacturing such an alloy in a particle state include a mechanical alloying method and an arc plasma melting method. The negative electrode may be formed in a manner such that a binder, an electric conducting additive and a viscosity control solvent are added to the particles obtained by these manufacturing methods to prepare slurry, and the slurry thus obtained is applied to the current collector. These manufacturing methods are superior in terms of mass production and practicality for actual battery electrodes compared to the methods for manufacturing the alloyed thin film described above.

The method for manufacturing the negative electrode active material for a lithium ion secondary battery is not limited to the methods described above, and may instead be another conventionally known method. That is, various manufacturing methods may be used, since there is little difference in the conditions and characteristics of the alloy produced by the manufacturing methods.

Hereinafter, the negative electrode for a lithium ion secondary battery and the lithium ion secondary battery are explained in detail with reference to the drawings.

[Constitution of Lithium Ion Secondary Battery]

FIG. 1 is a schematic cross-sectional view showing an example of the lithium ion secondary battery according to the embodiment of the present invention. As shown in FIG. 1, the lithium ion secondary battery 1 according to the present embodiment has a constitution in which a battery element 10 to which a positive electrode tab 21 and a negative electrode tab 22 are attached, is sealed in an exterior body 30. In the present embodiment, the positive electrode tab 21 and the negative electrode tab 22 are exposed on opposite sides on the outside of the exterior body 30. Note that the positive electrode tab and the negative electrode tab may be exposed on the same side on the outside of the exterior body (not shown in the figure). In addition, the positive electrode tab and the negative electrode tab may be attached to positive electrode current collectors and negative electrode current collectors described below by, for example, ultrasonic welding or resistance welding.

[Positive Electrode Tab and Negative Electrode Tab]

The positive electrode tab 21 and the negative electrode tab 22 are made from a material such as aluminum, copper, titanium, nickel, stainless steel (SUS), or an alloy thereof. However, the material is not limited to these, and may be any conventionally known material used for tabs for lithium ion secondary batteries.

The positive electrode tab 21 and the negative electrode tab 22 may be made from the same material, or may be made from different materials. The tabs may be prepared preliminarily and connected to the positive electrode current collectors and the negative electrode current collectors described below according to the present embodiment. Alternatively, each of the positive electrode current collectors and the negative electrode current collectors described below may be extended to form the respective tabs. Each part of the positive electrode tab 21 and the negative electrode tab 22 exposed on the outside of the exterior body 30 is preferably covered with, for example, a heat shrinkable tube having a heat resistant and insulating property (not shown in the figure). This reduces the chances of any negative influence on surrounding products (such as components in a vehicle, in particular, electronic devices) caused by a short circuit because of contact of the positive electrode tab 21 and the negative electrode tab 22 with peripheral devices or wires.

In addition, current collecting plates may be used to extract a current outside of the battery. Such current collecting plates are electrically connected to the current collectors and leads, and exposed on the outside of a laminated sheet that is the exterior body 30. The material constituting the current collecting plates is not particularly limited, and may be a highly electrically conductive material conventionally used for current collecting plates for lithium ion secondary batteries. For example, the constituent material for the current collecting plates is preferably a metallic material such as aluminum, copper, titanium, nickel, stainless steel (SUS), or an alloy thereof, more preferably aluminum or copper in view of lightness, corrosion resistance and high electric conductivity. The positive electrode current collecting plates and the negative electrode current collecting plates may be made from the same material, or may be made from different materials.

[Exterior Body]

The exterior body 30 is preferably made from a film-like exterior material in view of, for example, reduction in size and weight. However, the exterior body 30 is not limited to such a material, and may be a conventionally known material used for exterior bodies for lithium ion secondary batteries. Namely, a metal can casing may be used.

In order that the lithium ion secondary battery can have high output power and cooling performance and can be suitably used as a battery for large devices such as electric vehicles and hybrid electric vehicles, a polymer-metal composite laminated sheet having high thermal conductivity may be used. In particular, an exterior body made from an exterior material such as a laminated film having a three-layer structure in which PP, aluminum and nylon are laminated in this order, may be used.

[Battery Element]

As shown in FIG. 1, the battery element 10 has a constitution in which positive electrodes 11 each provided with positive electrode active material layers 11b on both main surfaces of a positive electrode current collector 11a, electrolyte layers 13, and negative electrodes 12 each provided with negative electrode active material layers 12b on both main surfaces of a negative electrode current collector 12a, are stacked on top of each other.

In this case, the positive electrode active material layer 11b provided on one main surface of the positive electrode current collector 11a of the positive electrode 11, faces the negative electrode active material layer 12b provided on one main surface of the negative electrode current collector 12a of the negative electrode 12. The positive electrode 11 and the negative electrode 12 are separated by the electrolyte layer 13 such that the electrolyte layer 13 lies between the positive electrode 11 and the negative electrode 12. Several sets of the positive electrode, the electrolyte layer and the negative electrode arranged in this order are stacked on top of each other. The positive electrode active material layer 11b, the electrolyte layer 13 and the negative electrode active material layer 12b adjacent to each other constitute a single cell layer 14. Namely, the lithium ion secondary battery 1 according to the present embodiment has a constitution in which the plural single cell layers 14 are stacked on top of each other so as to be electrically connected in parallel. Here, the negative electrode current collectors 12a located on the outermost layers of the battery element 10 are each provided with the negative electrode active material layer 12b only on one side thereof.

In addition, insulating layers (not shown in the figure) may be provided along the respective single cell layers to isolate the positive electrode current collectors and the negative electrode current collectors adjacent to each other. Such an insulating layer is preferably made from a material that holds the electrolyte contained in the electrolyte layer and prevents liquid leakage of the electrolyte. In particular, general-purpose plastic and thermoplastic olefin rubber such as polypropylene (PP), polyethylene (PE), polyurethane (PUR), polyamide resin (PA), polytetrafluoroethylene (PTFE), polyvinylidene fluoride (PVdF) and polystyrene (PS), may be used. Alternatively, silicone rubber may also be used.

[Positive Electrode Current Collector and Negative Electrode Current Collector]

The positive electrode current collector 11a and the negative electrode current collector 12a are made from an electrically conductive material. The size of the current collectors may be determined depending on the intended use of the battery. For example, current collectors having large areas are used for a large-size battery for which high energy density is required. The thickness of the current collectors is not particularly limited; however, the thickness is generally approximately in the range from 1 μm to 100 μm. The shape of the current collectors is not particularly limited. The battery element 10 shown in FIG. 1 may use current collecting foils or mesh current collectors (such as expanded grids). The current collecting foils are suitable for use when the thin film alloy as the negative electrode active material is directly formed on the negative electrode current collector 12a.

The material used for the current collectors is not particularly limited. Examples of the material include metal, and resin in which electrically conductive filler is added to an electrically conductive polymer material or a non-conductive polymer material. Examples of the metal include aluminum, nickel, iron, stainless steel, titanium and copper. In addition, a clad metal of nickel and aluminum, a clad metal of copper and aluminum, or an alloyed material of these metals combined together, is preferably used. A foil in which the metal surface is covered with aluminum may also be used. In particular, aluminum, stainless steel, copper and nickel are preferable in view of electron conductivity, battery action potential, and adhesion of the negative electrode active material to the current collectors by sputtering.

Examples of the electrically conductive polymer material include polyaniline, polypyrrole, polythiophene, polyacetylene, polyparaphenylene, polyphenylene vinylene, polyacrylonitrile and polyoxadiazole. These electrically conductive polymer materials have an advantage in simplification of the manufacturing process and lightness of the current collectors, since these materials have sufficient electric conductivity even if electrically conductive filler is not added thereto.

Examples of the non-conductive polymer material include polyethylene (PE; such as high-density polyethylene (HDPE) and low-density polyethylene (LDPE)), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF) and polystyrene (PS). These non-conductive polymer materials have high potential tolerance or solvent tolerance.

The electrically conductive polymer material or the non-conductive polymer material may include electrically conductive filler that is added as necessary. In particular, when the resin serving as a substrate of the current collector only includes a non-conductive polymer, the electrically conductive filler is essential to provide the resin with electric conductivity. The electrically conductive filler is not particularly limited as long as it is a substance having electric conductivity. Examples of the material having high electric conductivity, potential tolerance or lithium ion insulation, include metal and electrically conductive carbon. The metal is not particularly limited; however, the metal is preferably at least one element selected from the group consisting of Ni, Ti, Al, Cu, Pt, Fe, Cr, Sn, Zn, In, Sb and K, or an alloy or metal oxide containing these metals. The electrically conductive carbon is not particularly limited; however, the carbon is preferably at least one material selected from the group consisting of acetylene black, Vulcan (registered trademark), Black Pearls (registered trademark), carbon nanofiber, Ketjenblack (registered trademark), carbon nanotube, carbon nanohorn, carbon nanoballoon and fullerene. The amount of the electrically conductive filler added in the current collectors is not particularly limited as long as it provides the current collectors with sufficient electric conductivity. In general, the amount is approximately in the range from 5% to 35% by mass of the total.

However, the current collectors are not limited to the materials described above, and may be any conventional known material used for current collectors for lithium ion secondary batteries.

[Negative Electrode Active Material Layer]

The negative electrode active material according to the present embodiment contains, as an essential component, the Si—Al—Nb series alloy having the above-described composition. As described above, the negative electrode active material layer 12b according to the present embodiment may be a thin film including the Si—Al—Nb series alloy. In this case, the negative electrode active material layer 12b may consist of the Si—Al—Nb series alloy, or may contain other negative electrode active materials described below.

Alternatively, as described above, the negative electrode active material layer 12b may contain, as a main component, the particles of the Si—Al—Nb series alloy. In this case, the negative electrode active material 12b may contain the electric conducting additive and the binder as necessary. Note that, in the present description, "the main component" represents a component contained in the negative electrode active material layer 12b with content of greater than or equal to 50% by mass.

The lithium ion secondary battery, as the electric device, according to the present embodiment uses the negative electrode active material containing the Si—Al—Nb series alloy having the above-described composition. However, a conventionally known negative electrode active material capable of reversibly absorbing and releasing lithium may be combined without any particular obstacle as long as the negative electrode active material containing the above-described alloy is contained as an essential component. The other negative electrode active material used together may be a carbon material such as graphite that is highly crystalline carbon (such as natural graphite and artificial graphite), low crystalline carbon (such as soft carbon and hard carbon), carbon black (such as Ketjenblack (registered trademark), acetylene black, channel black, lamp black, oil furnace black and thermal black), fullerene, carbon nanotube, carbon nanofiber, carbon nanohorn and carbon fibril. Examples of the negative electrode active material further include a single substance alloyed with lithium such as Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te and Cl, and an oxide and a carbide containing the elements listed above. Examples of the oxide include silicon monoxide (SiO), $SiO_x$ ($0<x<2$), tin dioxide ($SnO_2$), $SnO_x$ ($0<x<2$) and $SnSiO_3$. The carbide may be silicon carbide (SiC). Other examples of the negative electrode active material include a metallic material such as a lithium metal, and a lithium-transition metal composite oxide such as a lithium-titanium composite oxide (lithium titanate: $Li_4Ti_5O_{12}$). However, the negative electrode active material is not limited to the materials described above, and may be a conventional known material used for negative electrode active materials for lithium ion secondary batteries. Each of these negative electrode active materials may be used singly, or two or more of these materials may be used together.

The binder is not particularly limited; however, the binder may be a thermoplastic polymer such as polyethylene (PE), polypropylene (PP), polyethylene terephthalate (PET), polyether nitrile (PEN), polyacrylonitrile (PAN), polyimide (PI), polyamide (PA), cellulose, carboxymethyl cellulose (CMC), an ethylene-vinyl acetate copolymer, polyvinyl chloride (PVC), styrene-butadiene rubber (SBR), isoprene rubber, butadiene rubber, ethylene-propylene rubber, an ethylene-propylene-diene copolymer, a styrene-butadiene-styrene block copolymer and a hydrogen additive thereof, and a styrene-isoprene-styrene block copolymer and a hydrogen additive thereof. The binder may also be fluorine resin such as polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE) and polyvinyl fluoride (PVF). Other examples of the binder include vinylidene fluoride fluoro rubber such as vinylidene fluoride-hexafluoropropylene fluoro rubber (VDF-HFP fluoro rubber), vinylidene fluoride-hexafluoropropylene-tetrafluoroethylene fluoro rubber (VDF-HFP-TFE fluoro rubber), vinylidene fluoride-pentafluoropropylene fluoro rubber (VDF-PFP fluoro rubber), vinylidene fluoride-pentafluoropropylene-tetrafluoroethylene fluoro rubber (VDF-PFP-TFE fluoro rubber), vinylidene fluoride-perfluoromethyl vinyl ether-tetrafluoroethylene fluoro rubber (VDF-PFMVE-TFE fluoro rubber) and vinylidene fluoride-chlorotrifluoroethylene fluoro rubber (VDF-CTFE fluoro rubber), and epoxy resin. Among these, polyvinylidene fluoride, polyimide, styrene-butadiene rubber, carboxymethyl cellulose, polypropylene, polytetrafluoroethylene, polyacrylonitrile and polyimide, are particularly preferable. These binders are suitable for use in the negative electrode active material layers and the positive electrode active material layers, since these binders have high heat resistance, have quite a wide potential window, and are stable with respect to both positive electrode potential and negative electrode potential. However, the binder is not limited to the materials described above, and may be a conventional known material used for binders for lithium ion secondary batteries. Each of these materials for the binder may be used singly, or two or more of these materials may be used together.

The amount of the binder contained in the negative electrode active material layer 12b is not particularly limited as long as it is sufficient to bind the negative electrode active material. However, the amount of the binder contained in the negative electrode active material layer is preferably in the range from 0.5% to 15% by mass, more preferably in the range from 1% to 10% by mass.

The electric conducting additive is added in order to improve electric conductivity in the negative electrode active material layer. The electric conducting additive may be a carbon material such as carbon black (such as acetylene black), graphite and vapor-phase growth carbon fiber. The addition of the electric conducting additive in the negative electrode active material layer contributes to effectively establishing an electronic network in the negative electrode active material layer, and improving the output performance of the battery. However, the electric conducting additive is not limited to the materials described above, and may be a conventional known material used for electric conducting additives for lithium ion secondary batteries. Each of these materials for the electric conducting additive may be used singly, or two or more of these materials may be used together.

The electric conducting additive and the binder may be substituted for an electrically conductive binder having both functions of the electric conducting additive and the binder. Alternatively, one of the electric conducting additive and the binder may be used singly, or the electric conducting additive and the binder may be used concurrently. The electrically conductive binder may be a commercially available binder such as TAB-2 manufactured by Hohsen Corp.

[Positive Electrode Active Material Layer]

The positive electrode active material layer 11b contains, as a positive electrode active material, any one of, or two or more positive electrode materials capable of absorbing and releasing lithium, and may contain the binder and the electric conducting additive as necessary. The binder and the electric conducting additive may be the same as those described above.

The positive electrode material capable of absorbing and releasing lithium is preferably a lithium-containing compound in view of having high capacity and good output performance. Examples of the lithium-containing compound include a composite oxide containing lithium and a transition metal element, a phosphate compound containing lithium and a transition metal element, a sulfate compound containing lithium and a transition metal element, and a solid solution containing lithium and a transition metal element. In particular, a lithium-transition metal composite oxide is preferable in view having higher capacity and better output performance.

Specific examples of the composite oxide containing lithium and a transition metal element include a lithium-cobalt composite oxide ($LiCoO_2$), a lithium-nickel composite oxide ($LiNiO_2$), a lithium-nickel-cobalt composite oxide ($LiNiCoO_2$), a lithium-nickel-manganese composite oxide ($LiNi_{0.5}Mn_{1.5}O_4$), a lithium-nickel-manganese-cobalt composite oxide ($Li(NiMnCo)O_2$, $Li(LiNiMnCo)O_2$), and a lithium-manganese composite oxide having a spinel structure ($LiMn_2O_4$). Specific examples of the phosphate compound containing lithium and a transition metal element include a lithium-iron phosphate compound ($LiFePO_4$), and a lithium-iron-manganese phosphate compound ($LiFeMnPO_4$). In addition, an oxide in which part of the transition metal contained in each of these composite oxides is substituted with other elements, may be used in view of structural stability. A specific example of the sulfate compound containing lithium and a transition metal element may be $Li_xFe_2(SO_4)_3$.

Specific examples of the solid solution containing lithium and a transition metal element include $xLiM^IO_2 \cdot (1-x)Li_2M^{II}O_3$ (wherein $0<x<1$, $M^I$ represents at least one transition metal element in an average oxidation state of 3+, and $M^{II}$ represents at least one transition metal element in an average oxidation state of 4+), and $LiM^{III}O_2$—$LiMn_2O_4$ ($M^{III}$ represents a transition metal element such as Ni, Mn, Co and Fe). Alternatively, the positive electrode active material may be other materials such as lithium metal.

The thickness of each of the positive electrode active material layer 11b and the negative electrode active material layer 12b (the active material layers provided on one surface of each current collector) is not particularly limited, and may be determined by referring to conventional knowledge about batteries. For example, the thickness of each active material layer is generally approximately in the range from 1 μm to 500 μm, preferably in the range from 2 μm to 100 μm, in view of the intended use of the battery (for example, priority on output, priority on energy) and ion conductivity.

In the case that the respective active materials require different particle diameters in order to achieve their own appropriate effects, the active materials having different particle diameters may be selected and mixed together so as to optimally function to achieve their own effects. Thus, it is not necessary to equalize the particle diameter of all of the active materials.

For example, when the Si—Al—Nb series alloy in the particle state is used as the negative electrode active material, the average particle diameter of the alloy is not particularly limited, and may be identical to that of negative electrode active materials contained in existing negative electrode active material layers. The average particle diameter may be preferably in the range from 1 µm to 20 µm in view of higher output power. Note that, in the description of the present invention, "the particle diameter" represents the greatest length between any two points on the circumference of the active material particle (the observed plane) observed by observation means such as a scanning electron microscope (SEM) and a transmission electron microscope (TEM). In addition, "the average particle diameter" represents a value calculated with the scanning electron microscope (SEM) or the transmission electron microscope (TEM) as an average value of particle diameters of the particles observed in several to several tens of fields of view. Particle diameters and average particle diameters of other constituents may be determined in the same manner.

However, the particle diameter is not limited to the range described above, and may be in any other range as long as it can achieve the effect of the present embodiment appropriately.

[Electrolyte Layer]

The electrolyte layer 13 may have a layer structure using, for example, an electrolysis solution, a polymer gel electrolyte or a solid polymer electrolyte held in a separator described below. Further, the electrolyte layer 13 may have a stacked structure using the polymer gel electrolyte or the solid polymer electrolyte.

The electrolysis solution preferably has a constitution suitable for use in the lithium ion secondary battery. In particular, the electrolysis solution has a constitution in which supporting salts (lithium salts) are dissolved in an organic solvent. The lithium salts may include at least one kind selected from the group consisting of inorganic acid anionic salts such as $LiPF_6$, $LiBF_4$, $LiClO_4$, $LiAsF_6$, $LiTaF_6$, $LiAlCl_4$ and $Li_2B_{10}Cl_{10}$, and organic acid anionic salts such as $LiCF_3SO_3$, $Li(CF_3SO_2)_2N$ and $Li(C_2F_5SO_2)_2N$. The organic solvent may be a aprotic solvent including at least one kind selected from the group consisting of cyclic carbonate such as propylene carbonate (PC) and ethylene carbonate (EC); chain carbonate such as dimethyl carbonate (DMC), ethyl methyl carbonate (EMC) and diethyl carbonate (DEC); ether such as tetrahydrofuran, 2-methyltetrahydrofuran, 1,4-dioxane, 1,2-dimethoxyethane and 1,2-dibutoxyethane; lactone such as γ-butyrolactone; nitrile such as acetonitrile; ester such as methyl propionate; amide such as dimethylformamide; methyl acetate; and methyl formate, or two or more kinds thereof mixed together. Examples of the separator include a microporous film, a porous flat plate and a non-woven fabric containing polyolefin such as polyethylene and polypropylene.

The polymer gel electrolyte may be obtained in a manner such that a polymer constituting the polymer gel electrolyte and the electrolysis solution are contained in a conventionally used ratio. The content of the polymer in the polymer gel electrolyte may be preferably in the range from a small percentage to 98% by mass in view of ion conductivity.

As described above, the polymer gel electrolyte is obtained in a manner such that the electrolysis solution usually used for a lithium ion secondary battery is contained in the solid polymer electrolyte having ion conductivity. However, the polymer gel electrode is not limited to such a constitution, and may be obtained in a manner such that the same electrolysis solution is held in a framework of a polymer with no lithium ion conductivity.

Examples of the polymer with no lithium ion conductivity used in the polymer gel electrolyte include polyvinylidene fluoride (PVdF), polyvinyl chloride (PVC), polyacrylonitrile (PAN) and polymethyl methacrylate (PMMA). However, the polymer is not particularly limited to these examples. It should be noted that PAN and PMMA could be defined as a polymer having the ion conductivity, but since these polymers tend to have lower ion conductivity, in the present embodiment, PAN and PMMA are defined as a polymer with no lithium ion conductivity used in the polymer gel electrolyte.

The solid polymer electrolyte may be an electrolyte having a constitution in which the lithium salts are dissolved in, for example, polyethylene oxide (PEO) and polypropylene oxide (PPO), but no organic solvent is contained. Therefore, liquid leakage from the battery is prevented when the electrolyte layer contains the solid polymer electrolyte and accordingly, the reliability of the battery can be enhanced.

The thickness of the electrolyte layer is preferably reduced as much as possible so as to reduce internal resistance. The thickness of the electrolyte layer is generally in the range from 1 µm to 100 µm, preferably in the range from 5 µm to 50 µm.

A matrix polymer of the polymer gel electrolyte and the solid polymer electrolyte can exhibit high mechanical strength when a cross-linked structure is formed. The cross-linked structure may be formed in a manner such that a polymerizable polymer used for polymer electrolyte formation (for example, PEO and PPO) is subjected to polymerization, such as thermal polymerization, ultraviolet polymerization, radiation polymerization and electron beam polymerization, by use of an appropriate polymerization initiator.

The following is an example of a method for manufacturing the lithium ion secondary battery according to the present embodiment. The positive electrode is prepared first. When the positive electrode active material in the particle state is used, the positive electrode active material and the electric conducting additive, the binder and the viscosity control solvent are mixed as necessary to prepare positive electrode slurry. The positive electrode slurry thus obtained is applied to the positive electrode current collector, and then dried and subjected to compression molding, so as to form the positive electrode active material layer.

Next, the negative electrode is prepared. When the negative electrode active material in the particle state is used, the negative electrode active material and the electric conducting additive, the binder and the viscosity control solvent are mixed as necessary to prepare negative electrode slurry. The negative electrode slurry thus obtained is applied to the negative electrode current collector, and then dried and subjected to compression molding, so as to form the negative electrode active material layer.

Then, the positive electrode tab is attached to the positive electrode, the negative electrode tab is attached to the negative electrode, and the positive electrode, the separator and the negative electrode are stacked on top of each other. Further, the stacked elements are covered with a polymer-metal composite laminated sheet, and sealed by heat along the edge thereof except one side, so as to form the exterior body in a bag shape.

Then, lithium salts such as lithium hexafluorophosphate and a non-aqueous electrolyte containing an organic solvent such as ethylene carbonate are prepared, and these are poured into the exterior body from the opening, and the opening of the exterior body is then sealed by heat. This completes the laminated lithium ion secondary battery.

EXAMPLE

Hereinafter, the present invention is explained in more detail with reference to examples and comparative examples; however, the present invention is not limited to these examples.

Preparation of Batteries in Example 1 to Example 11 and Comparative Example 1 to Comparative Example 10

<Preparation of Negative Electrode for Lithium Ion Secondary Battery>

As a sputtering apparatus, an independently controllable ternary DC magnetron sputtering apparatus (manufactured by Yamato-Kiki Industrial Co., Ltd.; combinatorial sputter coating apparatus; gun-sample distance: about 100 mm) was used. The negative electrode for a lithium ion secondary battery of each example was manufactured under the following sputtering conditions, target specs, and electrode sample specs.

(Sputtering Conditions)
1) Base pressure: up to $7 \times 10^{-6}$ Pa
2) Sputtering gas: Ar (99.9999% or more)
3) Sputtering gas introduction amount: 10 sccm
4) Sputtering pressure: 30 mTorr
5) DC power source: Si (185 W), Al (30 to 120 W), Nb (60 to 120 W)
6) Pre-sputtering time: 1 min.
7) Sputtering time: 10 min.
8) Substrate heating: room temperature (25° C.)

(Target Specs)
1) Si target (manufactured by Kojundo Chemical Laboratory Co., Ltd.; purity: 4N; diameter: 2 inches; thickness: 3 mm)+backing plate of oxygen-free copper (thickness: 2 mm)
2) Al target (manufactured by Kojundo Chemical Laboratory Co., Ltd.; purity: 5N; diameter: 2 inches; thickness: 5 mm)
3) Nb target (manufactured by Kojundo Chemical Laboratory Co., Ltd.; purity: 3N; diameter: 2 inches; thickness: 5 mm)

(Electrode Sample Specs)
1) Substrate as current collector: Ni foil (thickness: 20 μm)
2) Sputtering film thickness: Si was always 100 nm, and film thicknesses of the additive elements (Al and Nb) were appropriately changed for each of the sputtering power levels. More specifically, the DC power source was changed to achieve each of the sputtering power levels so that the thickness of the additive elements (Al and Nb) increased along with an increase in each of the additive element concentrations.

3) Table 1 shows composition ratios of the alloys (% by mass). More specifically, an Si target, an Al target and an Nb target were used, the sputtering time was fixed, and the power levels of the DC power source were changed within the above-described ranges. Then, alloyed thin films in an amorphous state were formed on Ni substrates, so that various alloy samples were obtained as electrodes for evaluation.

As for the sample preparation, for example, in Example 5, the DC power source 1 (Si target) was set to 185 W, the DC power source 2 (Al target) was set to 60 W, and the DC power source 3 (Nb target) was set to 90 W. In Comparative Example 3, the DC power source 1 (Si target) was set to 185 W, the DC power source 2 (Al target) was set to 72 W, and the DC power source 3 (Nb target) was set to 0 W. In Comparative Example 9, the DC power source 1 (Si target) was set to 185 W, the DC power source 2 (Al target) was set to 0 W, and the DC power source 3 (Nb target) was set to 55 W.

(Analysis of Electrode Samples)

The obtained alloy samples were analyzed by using the following analysis method and analysis device:
1) Composition analysis: SEM-EDX analysis (manufactured by JEOL Ltd.), EPMA analysis (manufactured by JEOL Ltd.)
2) Film thickness measurement (for calculating sputtering rate): film thickness meter (manufactured by Tokyo Instruments, Inc.)
3) Film state analysis: Raman spectroscopic analysis (manufactured by Broker Corporation)

<Manufacture of Lithium Ion Secondary Battery for Evaluation (CR2032Type Coin Cell>
1) Counter electrode (positive electrode): Li foil (diameter: 15 mm; thickness: 200 μm; manufactured by Honjo Metal Co., Ltd.)
2) Coin cell: CR2032 type prescribed in IEC60086
3) Separator: Celgard 2400 (manufactured by Celgard, LLC.)
4) Electrolysis solution: 1M $LiPF_6$/EC+DEC (1:1 (volume ratio))
5) Electrode for evaluation (negative electrode): the prepared alloy samples Example 1 to Example 11 and Comparative Example 1 to Comparative Example 10

The cells for evaluation (CR2032 type coin cells) were formed by combining the electrodes for evaluation with the Li foil (counter electrode), the separator, and the electrolysis solution. Table 1 shows the specs of the respective examples.

TABLE 1

|  | Si (% by mass) | Al (% by mass) | Nb (% by mass) | Initial Charging Capacity (mAh/g) | Discharging Capacity Maintenance Ratio After 50 Cycles (%) | Discharging Capacity Maintenance Ratio After 100 Cycles (%) |
| --- | --- | --- | --- | --- | --- | --- |
| Example 1 | 94.28 | 2.76 | 2.96 | 2376 | 93 | 45 |
| Example 2 | 83.98 | 2.46 | 13.56 | 1818 | 94 | 55 |
| Example 3 | 75.71 | 2.22 | 22.08 | 1350 | 92 | 60 |
| Example 4 | 73.14 | 24.56 | 2.30 | 1752 | 96 | 53 |
| Example 5 | 66.79 | 22.42 | 10.79 | 1408 | 98 | 71 |
| Example 6 | 61.45 | 20.63 | 17.92 | 1010 | 95 | 70 |
| Example 7 | 59.75 | 38.37 | 1.88 | 1363 | 95 | 45 |
| Example 8 | 55.44 | 35.60 | 8.95 | 1152 | 94 | 53 |
| Example 9 | 51.71 | 33.21 | 15.08 | 900 | 88 | 60 |

TABLE 1-continued

|  | Si (% by mass) | Al (% by mass) | Nb (% by mass) | Initial Charging Capacity (mAh/g) | Discharging Capacity Maintenance Ratio After 50 Cycles (%) | Discharging Capacity Maintenance Ratio After 100 Cycles (%) |
|---|---|---|---|---|---|---|
| Example 10 | 50.50 | 47.91 | 1.59 | 1216 | 96 | 59 |
| Example 11 | 47.39 | 44.96 | 7.65 | 1001 | 94 | 69 |
| Comparative Example 1 | 77.30 | 22.70 | 0.00 | 2217 | 83 | 40 |
| Comparative Example 2 | 78.04 | 21.96 | 0.00 | 2254 | 83 | 43 |
| Comparative Example 3 | 78.82 | 21.18 | 0.00 | 2334 | 63 | 36 |
| Comparative Example 4 | 79.64 | 20.36 | 0.00 | 2508 | 46 | 26 |
| Comparative Example 5 | 80.52 | 19.48 | 0.00 | 2601 | 28 | 17 |
| Comparative Example 6 | 81.45 | 18.55 | 0.00 | 2541 | 34 | 17 |
| Comparative Example 7 | 100.00 | 0.00 | 0.00 | 3232 | 47 | 22 |
| Comparative Example 8 | 94.02 | 0.00 | 5.98 | 2696 | 87 | 39 |
| Comparative Example 9 | 90.70 | 0.00 | 9.30 | 2586 | 83 | 38 |
| Comparative Example 10 | 84.06 | 0.00 | 15.94 | 2624 | 68 | 34 |

The cells for evaluation were charged and discharged under the following charge-discharge test conditions by using a charge-discharge tester in a thermostat bath maintained to an evaluation temperature described below. Each cell for evaluation was charged at 0.1 mA from 2 V to 10 mV at the constant current/constant voltage mode during charging, that is, in the process of Li intercalation to the electrode for evaluation. After that, each cell for evaluation was discharged at 0.1 mA from 10 mV to 2 V at the constant current mode during discharge, that is, in the process of Li release from the electrode for evaluation. This charge-discharge procedure can be regarded as a single charge-discharge cycle. A charge-discharge test was carried out by repeating the above-described charge-discharge cycle under the same charge-discharge conditions. Results were recorded by measuring discharge capacities at the initial cycle (1st cycle), the 50th cycle, and the 100th cycle. Note that, in Table 1, "Discharging capacity maintenance ratio (%) after 50 cycles" represents a ratio of the discharging capacity at the 50th cycle to the discharging capacity at the 1st cycle ((discharging capacity at 50th cycle)/(discharging capacity at 1st cycle)×100). Similarly, in Table 1, "Discharging capacity maintenance ratio (%) after 100 cycles" represents a ratio of the discharging capacity at the 100th cycle to the discharging capacity at the 1st cycle ((discharging capacity at 100th cycle)/(discharging capacity at 1st cycle)×100). The charge-discharging capacity was calculated per alloy weight. Table 1 also shows the obtained results.

(Charge-discharge Test Conditions)

1) Charge-discharge tester: HJ0501SM8A (manufactured by Hokuto Denko Corporation)

2) Charge-discharge conditions:

[Charging] 0.1 mA, 2 V→10 mV (constant current/constant voltage mode);

[Discharging] 0.1 mA, 10 mV→2 V (constant current mode)

3) Thermostat bath: PFU-3K (manufactured by ESPEC Corp.)

4) Evaluation temperature: 300K (27° C.)

Figure 2:
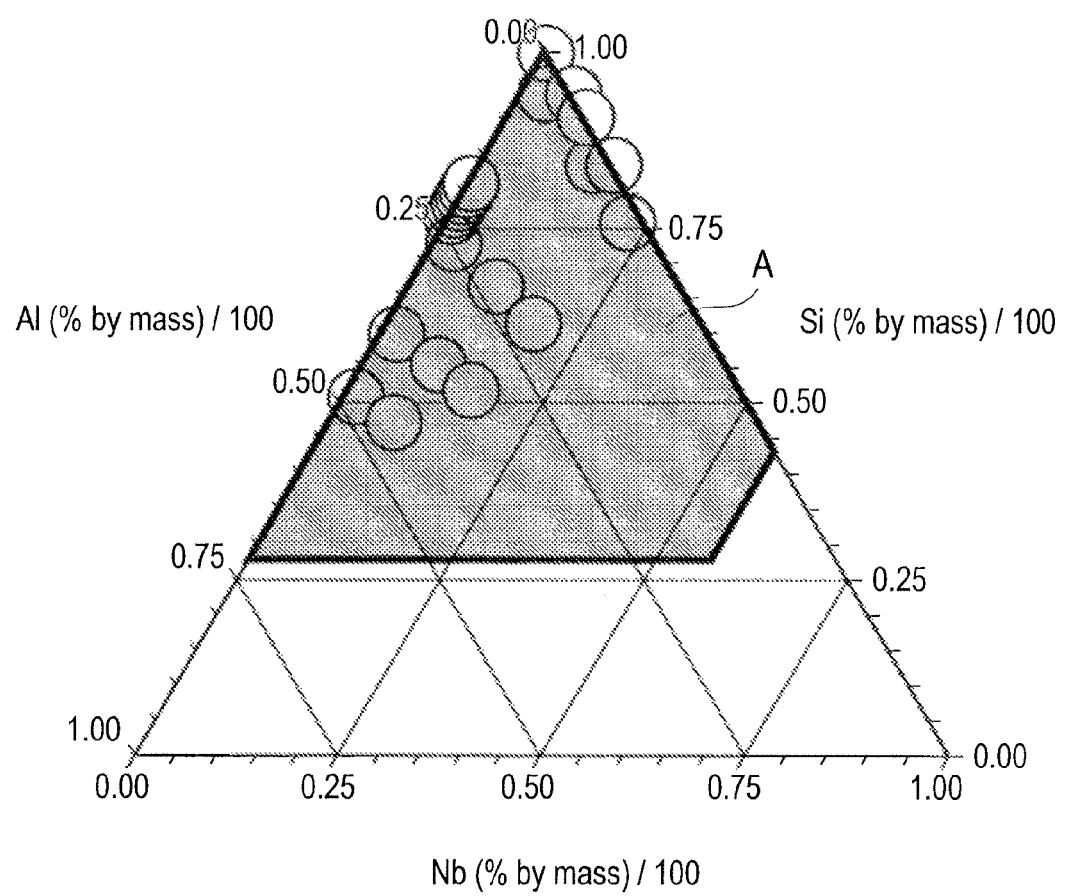
FIG. 2 is a composition diagram of Si—Al—Nb series ternary alloys, in which each example is plotted in the area of $0.27<$Si (% by mass/100)$<1.00$, $0.00<$Al (% by mass/100)$<0.73$ and $0.00<$Nb (% by mass/100)$<0.58$.

The alloy included in the area indicated by reference numeral A in FIG. 2 contains silicon with content in the range from 27% by mass to 100% by mass exclusive, aluminum with content in the range from 0% by mass to 73% by mass exclusive, niobium with content in the range from 0% by mass to 58% by mass exclusive, and inevitable impurities as a residue. As is apparent from Table 1, the lithium ion secondary battery using this alloy can achieve a high cycle property while keeping a high discharging capacity compared to a carbon-based negative electrode active material having a charge-discharging capacity of approximately 300 mAh/g.

Figure 3:
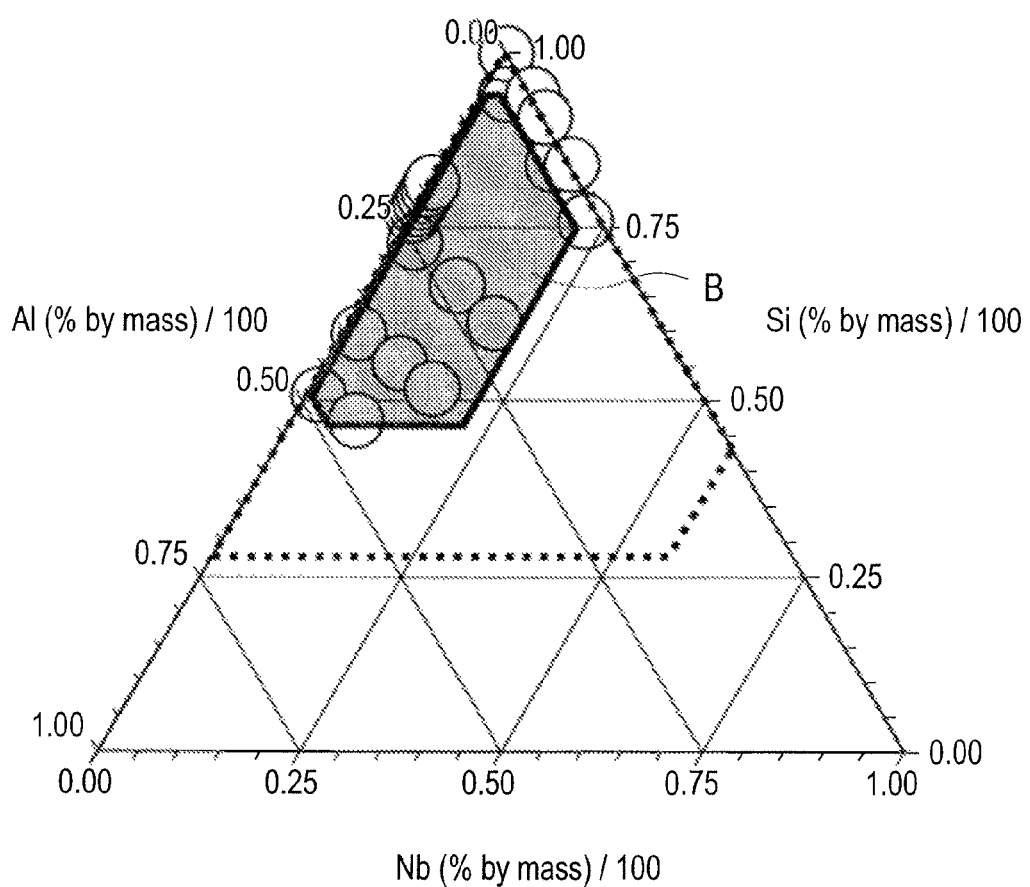
FIG. 3 is a composition diagram of Si—Al—Nb series ternary alloys, in which each example is plotted in the area of $0.47<$Si (% by mass/100)$<0.95$, $0.02<$Al (% by mass/100)$<0.48$ and $0.01<$Nb (% by mass/100)$<0.23$.

The alloy included in the area indicated by reference numeral B in FIG. 3 contains silicon with content in the range from 47% by mass to 95% by mass exclusive, aluminum with content in the range from 2% by mass to 48% by mass exclusive, niobium with content in the range from 1% by mass to 23% by mass exclusive, and inevitable impurities as a residue. Example 1 to Example 11 correspond to the alloy included in the area indicated by reference numeral B. As is apparent from Table 1, the lithium ion secondary battery particularly using such an alloy has a high discharging capacity maintenance ratio after 50 cycles.

Figure 4:
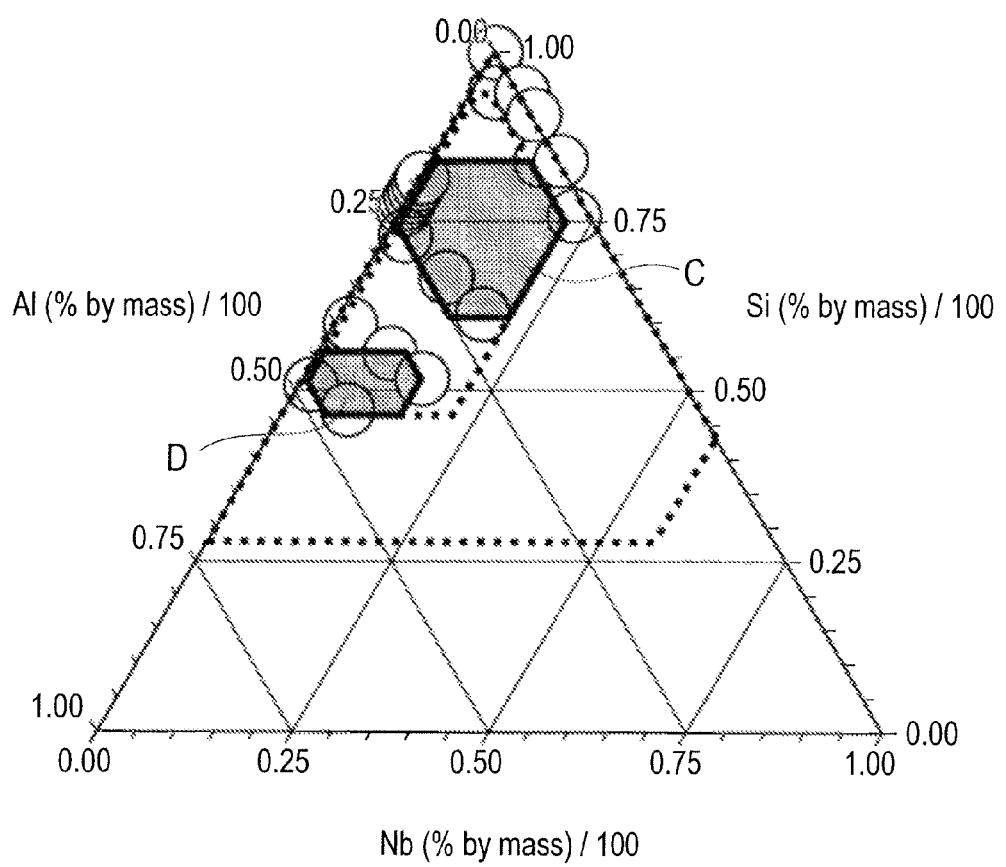
FIG. 4 is a composition diagram of Si—Al—Nb series ternary alloys, in which each example is plotted in the area of $0.61<$Si (% by mass/100)$<0.84$, $0.02<$Al (% by mass/100)$<0.25$ and $0.02<$Nb (% by mass/100)$<0.23$, or in the area of $0.47<$Si (% by mass/100)$<0.56$, $0.33<$Al (% by mass/100)$<0.48$ and $0.01<$Nb (% by mass/100)$<0.16$.

The alloy included in the area indicated by reference numeral C in FIG. 4 contains silicon with content in the range from 61% by mass to 84% by mass exclusive, aluminum with content in the range from 2% by mass to 25% by mass exclusive, niobium with content in the range from 2% by mass to 23% by mass exclusive, and inevitable impurities as a residue. Example 2 to Example 6 correspond to the alloy included in the area indicated by reference numeral C in FIG. 4.

The alloy included in the area indicated by reference numeral D in FIG. 4 contains silicon with content in the range from 47% by mass to 56% by mass exclusive, aluminum with content in the range from 33% by mass to 48% by mass exclusive, niobium with content in the range from 1% by mass to 16% by mass exclusive, and inevitable impurities as a residue. Example 8 to Example 11 correspond to the alloy included in the area indicated by reference numeral D in FIG. 4. As is apparent from Table 1, the lithium ion secondary batteries particularly using the alloys included in the areas indicated by reference numeral C and reference numeral D have a high discharging capacity maintenance ratio even after 100 cycles.

The entire contents of Japanese Patent Application No. P2011-048813 (filed on Mar. 7, 2011) and Japanese Patent Application No. P2011-116891 (filed on May 25, 2011) are herein incorporated by reference.

Although the present invention has been described above by reference to the examples, the present invention is not limited to the descriptions thereof, and it will be apparent to those skilled in the art that various modifications and improvements can be made.

The lithium ion secondary battery is exemplified as an electric device in the present embodiment and the examples; however, the present invention is not limited to the lithium ion secondary battery and is applicable to secondary batteries of other types and, further, to primary batteries. In addition, the present invention is applicable not only to the batteries but also to capacitors. In other words, the negative electrode for an electric device and the electric device according to the present invention are only required to contain a predetermined alloy as a negative electrode active material, and other constitution requirements are not particularly limited.

The present invention is also applicable to button type batteries and can type batteries, in addition to the laminated battery described above. Further, the present invention is applicable not only to stacking type (flat-shaped) batteries but also to wound type (cylinder-shaped) batteries. In terms of electrical connection inside the lithium ion secondary battery, the present invention is applicable not only to internal parallel connection-type batteries as described above but also to internal serial connection-type batteries such as bipolar batteries. Note that, in general, a battery element in a bipolar battery has a constitution in which bipolar electrodes, each provided with a negative electrode active material layer on one side of a current collector and a positive electrode active material layer on the other side of the current collector, and electrolyte layers, are stacked on top of each other.

INDUSTRIAL APPLICABILITY

The present invention uses, as the negative electrode active material for an electric device, the silicon alloy containing predetermined contents of Si, Al and Nb, Accordingly, the present invention can provide the negative electrode active material for an electric device such as a lithium ion secondary battery capable of achieving a high cycle property while keeping a high discharging capacity, and the negative electrode for an electric device and the electric device using the negative electrode active material.

REFERENCE SIGNS LIST

1 Lithium ion secondary battery
10 Battery element
11 Positive electrode
12 Negative electrode
12a Negative electrode current collector
12b Negative electrode active material layer
13 Electrolyte layer
30 Exterior body

The invention claimed is:

1. A negative electrode active material for an electric device, comprising an alloy consisting of silicon in a range from greater than or equal to 61.45% by mass to less than or equal to 75.71% by mass, aluminum in a range from greater than or equal to 2.22% by mass to less than or equal to 22.42% by mass, niobium in a range from greater than or equal to 10.79% by mass to less than or equal to 22.08% by mass, and inevitable impurities as a residue.

2. A negative electrode active material for an electric device, comprising an alloy consisting of silicon in a range from greater than or equal to 47.39% by mass to less than or equal to 51.71% by mass, aluminum in a range from greater than or equal to 33.21% by mass to less than or equal to 47.91% by mass, niobium in a range from greater than or equal to 1.59% by mass to less than or equal to 15.08% by mass, and inevitable impurities as a residue.

3. A negative electrode for an electric device, comprising the negative electrode active material according to claim 1.

4. An electric device comprising the negative electrode according to claim 3.

5. The electric device according to claim 4 that is a lithium ion secondary battery.

6. A negative electrode for an electric device, comprising the negative electrode active material according to claim 2.

7. An electric device comprising the negative electrode according to claim 6.

8. The electric device according to claim 7 that is a lithium ion secondary battery.

* * * * *